(12) United States Patent
Bestmann

(10) Patent No.: US 7,032,517 B2
(45) Date of Patent: Apr. 25, 2006

(54) METHOD FOR THE REPRODUCTION OF SPOT COLORS WITH PRIMARY PRINTING INKS AND SECONDARY PRINTING INKS

(75) Inventor: Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/991,247

(22) Filed: Nov. 17, 2004

(65) Prior Publication Data

US 2005/0150411 A1 Jul. 14, 2005

(30) Foreign Application Priority Data

Jan. 14, 2004 (DE) .................. 10 2004 001 937

(51) Int. Cl.
- *B41F 1/54* (2006.01)
- *G06F 15/00* (2006.01)
- *G03G 5/00* (2006.01)

(52) U.S. Cl. .................. 101/484; 358/1.9; 430/137

(58) Field of Classification Search ................ 101/484, 101/211; 358/1.9, 3.3, 501; 430/45, 264, 430/301; 399/237, 223, 228, 49
See application file for complete search history.

(56) References Cited

U.S. PATENT DOCUMENTS

| | | | |
|---|---|---|---|
| 3,740,222 A * | 6/1973 | McGlashan, Sr. .......... 430/264 |
| 5,734,800 A | 3/1998 | Herbert et al. .............. 358/1.9 |
| 6,061,501 A * | 5/2000 | Decker et al. ............... 358/1.9 |
| 6,066,422 A | 5/2000 | Blaszak et al. ............... 430/45 |
| 6,137,594 A * | 10/2000 | Decker et al. ............... 358/1.9 |
| 6,281,984 B1 * | 8/2001 | Decker et al. ............... 358/1.9 |
| 2004/0114163 A1 | 6/2004 | Alderliefste ................ 358/1.9 |
| 2005/0099641 A1* | 5/2005 | Bolognino et al. .......... 358/1.9 |

FOREIGN PATENT DOCUMENTS

| EP | 0 131 145 B1 | 1/1985 |
|---|---|---|
| WO | WO02/071739 A1 | 9/2002 |

* cited by examiner

*Primary Examiner*—Andrew H. Hirshfeld
*Assistant Examiner*—Wasseem H. Hamdan
(74) *Attorney, Agent, or Firm*—Laurence A. Greenberg; Werner H. Stemer; Ralph E. Locher

(57) ABSTRACT

Spot colors are reproduced with a combination of the primary printing inks cyan, magenta, yellow, black and at least one secondary printing ink red, green, blue. A first test form is printed with the primary printing inks and measured calorimetrically. Further test forms, in which one of the colored primary printing inks is replaced by a substantially complementary secondary printing ink, are printed and measured calorimetrically. An International Color Consortium (ICC) color profile is calculated from the measured data of each test form. For each spot color to be reproduced, the proportions of printing inks of the ICC color profile achieving the lowest deviation between the spot color and the reproduced color are determined. The printing ink combination belonging to that ICC profile is selected for the reproduction of the spot color. It is possible to reproduce as many spot colors as desired with four primary printing inks and a maximum of three secondary printing inks.

7 Claims, 4 Drawing Sheets

METHOD FOR THE REPRODUCTION OF SPOT COLORS WITH PRIMARY PRINTING INKS AND SECONDARY PRINTING INKS

BACKGROUND OF THE INVENTION

Field of the Invention

The invention lies in the field of electronic reproduction technology and relates to a method for the reproduction of spot colors with a combination of primary printing inks and secondary printing inks. Sport colors, also referred to as special colors or decorative colors, are used in reproduction and printing technology in order to reproduce product-specific colors or company-specific colors in printed products. Examples of spot colors are the unique blue on Nivea® products or the special blue used in the design mark HEIDELBERG® in the company logo of Heidelberger Druckmaschinen AG of Germany. Spot colors have to be reproduced with very good color fidelity, since they are often a significant identifier of the products and the corporate identity of companies and therefore have a high recognition and association value.

In reproduction technology, printing originals for printed pages that contain all the elements to be printed such as texts, graphics, and images are produced. For color printing, a separate printing original is produced for each printing ink and contains all the elements which are printed in the respective color. For four-color printing, these are the printing inks cyan (C), magenta (M), yellow (Y) and black (K). The printing originals separated in accordance with printing inks are also referred to as color separations. The printing originals are generally scanned and, by using an exposer, are exposed onto films, with which printing plates for printing large editions are then produced. Alternatively, the printing originals can also be exposed directly onto printing plates in special exposure devices, or they are transferred directly as digital data to a digital press. There, the printing-original data is then exposed onto printing plates, for example with an exposing unit integrated into the press, before the printing of the edition begins immediately thereafter. There are also digital presses which do not need any printing plates since, for example, they operate in accordance with the electro-photographic printing principle or with inkjet printing.

According to the current state of the art, the printing originals are reproduced electronically. In this case, the images are scanned in a color scanner and stored in the form of digital data. Texts are generated with text processing programs and graphics with drawing programs. Using a layout program, the image, text and graphic elements are assembled to form a printed page. The data from a plurality of printed pages is combined with data from further elements, such as register crosses, cutting marks and folding marks and print control fields, to form printing originals for a printed sheet. The data formats largely used nowadays to describe the printing originals are the page description languages PostScript and PDF (portable document format). In a first step, the PostScript or PDF data is converted in a raster image processor (RIP) into color separation values for the color separations C, M, Y and K before the recording of the printing originals. In the process, for each image point, four color separation values are produced as tonal values in the value range from 0 to 100%. The color separation values are a measure of the color densities with which the four printing inks cyan, magenta, yellow and black have to be printed on the printing material. In special cases, in which printing is carried out with more than four colors, each image point is described by as many color separation values as there are printing inks. The color separation values can be stored, for example, as a data value with 8 bits for each image point and printing ink, with which the value range from 0% to 100% is subdivided into 256 tonal value steps.

The colors of the elements of a printed page are usually not defined directly in the CMYK color system of the printing inks but, as a rule, in another color system. For example, the images are broken down in a scanner by means of color filters into the color components red, green and blue (RGB), that is to say into the components of a three-dimensional color space. Therefore, before the printing originals are recorded on color separation films or printing plates, the image data has to be transformed from the RGB color space of the scanner into the CMYK color space of the printing process to be used.

Such color space transformations are needed in reproduction technology, since the devices and processes used have specific restrictions and special features in the display and reproduction of the colors and these properties are different in all the devices and processes. Therefore, for different devices and processes such as scanners, monitors, proofers, and printing processes and so on, there are different color spaces, which in each case describe the color characteristics of the device or process optimally and which are designated device-dependent color spaces. In addition to the device-dependent color spaces there are also device-independent color spaces, which are based on the human viewing characteristics of what is known as a standard observer. Such color spaces are, for example, the XYZ color space defined by the CIE standardization commission (Commission International d'Éclairage) or the Lab color space derived from this, the Lab color space having gained wider acceptance in the technology. If it is wished to know whether two colors will be perceived as identical or different by the human eye, then the measurement of the XYZ or Lab color components is sufficient for this purpose. The Lab color components form a three-dimensional color space having a lightness axis (L) and two color axes (a, b), which can be imagined in the plane of a color circle through whose center the lightness axis runs. The Lab color components are related to the XYZ color components via nonlinear conversion equations.

A device or color processing process can be characterized with respect to its color characteristics by all the possible value combinations of the associated device dependent color space being assigned the Lab color components which a human sees in the colors produced with these value combinations. For a printing process, the various CMYK value combinations in each case produce a different printed color. Using a color measuring instrument, the Lab components of the printed colors can be determined and assigned to the CMYK value combinations. Such an assignment, which relates the device dependent colors produced by a device or process to a device independent color space (XYZ or Lab) is also designated a color profile, an output color profile in the case of a printing process. The definition and data formats for color profiles have been standardized by the ICC (International Color Consortium—Specification ICC. 1:2003-09). In an ICC color profile, the association between the color spaces is stored in both directions, for example the assignment Lab=f1 (CMYK) and the inverse assignment CMYK=f2 (Lab). The assignments defined by a color profile can be implemented with the aid of a look-up table. If, for example, the CMYK color components of a printing process are to be assigned the Lab color components of a printing process, the look-up table must have sufficient space, in which the associated Lab color components are stored for each possible value combination of the CMYK color components. However, this simple association method has the disadvantage that the look-up table can become very large. If each of the CMYK color components has 256 total value steps, there are $256^4=4,294,967,296$ possible value combinations of the CMYK color components. The look-up table must therefore have 4,294,967,296 storage cells with six bytes word length (two bytes each for L, a, b). In order to reduce the size of the look-up table, a combination of look-up table and interpolation method is therefore used in order to describe a color profile and to implement an appropriate color space transformation. In the look-up table, only the associated Lab components for a coarse, regular grid of reference cells in the CMYK color space are stored. For CMYK value combinations which lie between the grid points, the Lab color values to be assigned are interpolated from the stored Lab color values of the adjacent reference points.

In order to transform the RGB color values of a scanned image into the CMYK color values of the printing process, the association tables of a scanner color profile and of a printing process color profile are applied one after the other. First of all, the RGB color values are converted by means of the scanner color profile into the device independent Lab color values. These are then converted by means of the printing process color profile into the CMYK color values of the printing process. Alternatively, the two color profiles can also be linked in advance to form a conversion color profile, whose tables contain the direct assignment of the RGB color values to the CMYK color values. Since the RGB color values and the CMYK color values which result in the same Lab color values are in each case associated with one another via the device independent Lab intermediate color space, the associated colors are perceived as visually identical. However, this assignment is only possible within the restricted color gamut which can be printed with the CMYK printing inks. If the color gamut of the RGB color values of a scanned image is larger, such as is the case for color slides, for example, it is not possible for all the colors of the image to be reproduced exactly with the CMYK printing inks. Then, color gamut mapping is incorporated in the assignment of the Lab color values to the CMYK color values of the printing process, compressing the colors to the printable color gamut. In this case, in particular the unprintable light and saturated colors are converted into similar colors in the marginal area of the color gamut of the printable colors, so that the result is an overall harmonious color impression without subjectively perceived color distortions. These restrictions can be reduced if, instead of the standard printing inks for CMY and K, special CMYK printing inks which have a higher chroma or blackness are used. Another solution is printing with further colored printing inks in addition to the CMYK printing inks, for example with three further printing inks R, G, and B, which widen the printable color gamut in the region of the red, green and blue hues.

The associations specified in the color profiles between device dependent color spaces and a device independent color space (e.g. Lab) are also used for the reproduction of spot colors, according to the prior art. In the PostScript or PDF page description of a printed page, the spot color is designated by a name and/or a number and, in addition, the Lab values of the spot color are specified. In order to simplify the application, there are standardized spot color systems, for example systems from Pantone Inc., which provide a large selection of spot colors with defined designations and the associated Lab values. The Lab values of the spot colors specified in the page description are then converted by the raster image processor (RIP) or another suitable application into the CMYK color values via the printing process color profile. Alternatively, for the spot colors, in addition to the designation, the proportions of the CMYK printing inks can also be specified directly in the PDF page description. The spot colors simulated in this way are, however, subject to an increased extent to the process fluctuations of the printing process and change accordingly. Since, in the case of the spot colors, faithful color reproduction in particular is involved, this simple solution is often not sufficient either because of the restricted color gamut of the printable colors. Therefore, spot colors are also reproduced as separate color separations, which are printed with specifically mixed additional printing inks. Such a solution is complicated and, in addition, is restricted to two to three spot colors in a printed product.

If, in the printing process, because of the restriction of the color gamut of the CMYK printing inks, further colored printing inks are already used, then the additional printing inks can also be used to simulate spot colors as well. In the following text, to make a clear distinction, the CMYK printing inks will be designated "primary printing inks" and the further color printing inks as "secondary printing inks". In such a system which, in addition to the primary printing inks C, M, Y and K, also uses the secondary printing inks red, green, blue (R, G and B), their pigments being considerably more colored than the corresponding mixed colors of the primary printing inks, it is possible to achieve better reproduction of the spot colors and, at the same time, improved process stability in the print. By using, for example, only three secondary printing inks, many different spot colors can be reproduced, and it is not necessary for mixed printing inks corresponding to all the spot colors to be kept in stock in a print shop. In addition, a shorter setup time of the press is achieved, since extra cleaning cycles of the printing units when changing from one spot color to another are avoided. FIG. 1 shows, in an xy color locus diagram, the color gamut 1 of the primary printing inks and the expanded color gamut 2 of the seven-color printing system comprising the primary printing inks and the secondary printing inks, for comparison.

European patent EP 0 131 145 B1 describes a printing process which operates with the seven printing inks yellow, orange-red, magenta red, violet-blue, cyan blue, green and black. If it is intended to print on printing materials which are not white, printing is additionally carried out with the eighth printing color white. An image to be reproduced is subdivided into small subareas and, in each subarea, proportional areas of a maximum of four printing inks are printed, in each case two of the colored printing inks and black and also, if appropriate, white. A special feature of the process is that the proportional areas are printed beside one another and not over one another. The area proportions to be printed are derived from three scanner color signals by means of simple operations such as subtraction, comparison, minimum determination. For instance, the proportion of white is determined as the smallest value of the scanner signals. After this value has been subtracted from all three scanner signals, the remaining two scanner signals determine which colored printing inks are printed with which area proportions.

U.S. Pat. No. 5,734,800 describes a six-color printing process in which printing is carried out with highly pigmented printing inks yellow, orange, magenta, cyan, green and black (YOMCGK). For the printing inks yellow, orange, magenta, use is preferably made of fluorescent colors, in order to increase the brilliance and saturation of the colors and to expand the printable color gamut. In order to determine what proportions of the printing inks are required in order to reproduce a specific color defined by the CIE color components XYZ, color panels are printed whose color areas are in each case superimposed tonal value steps of two printing inks adjacent in the color circle, that is to say color panels are printed for the combinations YOK, OMK, MCK, CGK and GYK. The printed color areas are measured calorimetrically and the XYZ values determined are plotted in a three-dimensional CIE diagram. For an image to be reproduced, the XYZ values of the image colors are likewise determined with a color scanner and compared with the XYZ values of the color panels. The assignment of the proportions of printing inks to the image colors is carried out on the basis of the XYZ values which best agree. International PCT publication WO 02/071739 A1 (corresponding to patent application publication US 2004/114163 A1) proposes a printing ink system in which printing is carried out with six printing inks. In addition to the four primary printing inks CMYK, the two secondary printing inks orange and blue or orange and green are provided. Scanned images are printed only with the primary printing inks, and elements which have a spot color are printed with the secondary printing inks orange and one of the two secondary printing inks blue and green and also, in supplementary fashion, with one or two of the primary printing inks. No statements are made as to the method by which the proportions of the printing inks with which a specific spot color is to be reproduced are determined.

Generally applicable methods for determining the proportions of primary printing inks and arbitrary secondary printing inks for the reproduction of spot colors with high color fidelity with, at the same time, high stability of the printing process are not known at present.

SUMMARY OF THE INVENTION

It is accordingly an object of the invention to provide a method of reproducing spot colors with primary printing inks and secondary printing inks which overcomes the above-mentioned disadvantages of the heretofore-known devices and methods of this general type and which provides for a process of determining the proportions of printing inks for the reproduction of spot colors in a printing process which, in addition to the primary printing inks CMYK, also uses one or more additional secondary printing inks, with which the printable color gamut in the region of specific hues is expanded.

With the foregoing and other objects in view there is provided, in accordance with the invention, a method of reproducing spot colors with a combination of primary printing inks and at least one secondary printing ink red, green, blue, the method which comprises:

(a) printing a first test form with the primary printing inks cyan, magenta, yellow, black and subjecting the first test form to a calorimetric measurement;

(b) printing at least one further test form, with one of the primary printing inks cyan, magenta and yellow replaced by a substantially complementary secondary printing ink, and subjecting the further test form to a colorimetric measurement;

(c) calculating an ICC color profile from the measured data of each of the test forms;

(d) for each spot color to be reproduced, determining proportions of printing inks of the ICC color profile with which a lowest deviation between the spot color and a reproduced color is achieved, and selecting a printing ink combination belonging to the ICC profile; and (e) for each spot color to be reproduced, assigning the proportions of the printing inks of the selected printing ink combination to the spot color.

In other words, the objects of the invention are achieved by creating color profiles for the printing process which, in addition to the primary printing inks, also include the secondary printing inks in the profiles. The method is distinguished by the fact that the prior art methods for creating ICC color profiles can be used. Likewise, the application of the color profiles for the assignment of proportions of printing inks to the spot colors can be carried out in a simple manner by means of association tables, as are known from the ICC color profiles for the primary printing inks. Both for the creation of the color profiles and for their application, the same program structures can largely be used which are already available for the creation and application of ICC color profiles.

In accordance with an added feature of the invention, the spot colors are identified by color values thereof in an Lab color system.

In accordance with an additional feature of the invention, the printed test forms are derived from standardized test forms (e.g., ISO 12642; DIN 16614).

In accordance with another feature of the invention, the deviation between the spot color and the reproduced color is determined by means of the Euclidian distance between their color values in the Lab color system.

In accordance with a further feature of the invention, the color values of the reproduced color in the Lab color system are determined by way of the reverse transformation into the Lab color values of the proportions of printing inks determined via the ICC color profiles.

In accordance with again a further feature of the invention, spot colors whose chroma lies below a predefined threshold value are reproduced only with the primary printing inks (CMYK).

In accordance with a concomitant feature of the invention, spot colors in whose selected printing ink combination a secondary printing ink is contained are reproduced with the highest possible proportion of the secondary printing ink.

Other features which are considered as characteristic for the invention are set forth in the appended claims.

Although the invention is illustrated and described herein as embodied in a method for the reproduction of spot colors with primary printing inks and secondary printing inks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The method according to the invention will be explained using the example of a printing process which, in addition to the primary printing inks CMYK, also uses the secondary printing inks red, green, blue (RGB). The pigments of the secondary printing inks preferably have a considerably higher chroma than the corresponding mixed colors of the primary printing inks. For example, the full-tone density (100% tonal value) of the secondary printing ink red is more colored than the overprint of the full-tone densities of the primary printing inks yellow and magenta. The chroma is defined as the radius in the ab plane of the Lab system:

$$c = \sqrt{a^2 + b^2} \quad (1)$$

The hue is defined as the angle in the ab plane of the Lab system:

$$h = \arctan\left(\frac{b}{a}\right) \quad (2)$$

Figure 2:
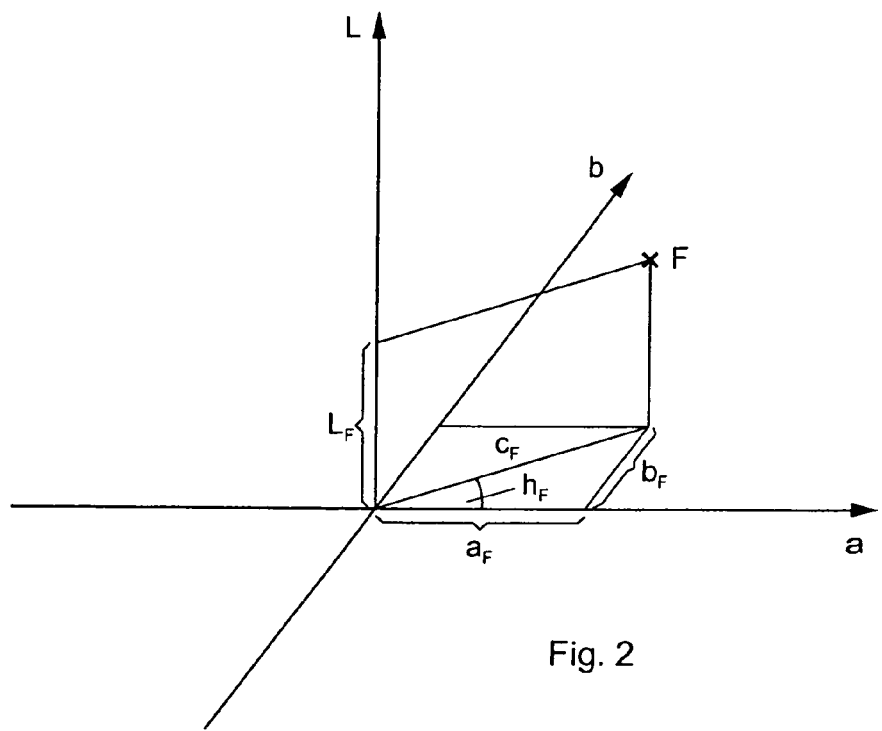
FIG. 2 shows the Lab color system.

FIG. 2 shows the parameters chroma $c_F$ and hue $h_F$ for a color F having the components $L_F$, $a_F$, $b_F$. The Lab color components form a three-dimensional color space having a lightness axis (L) and two chroma axes (a, b), which can be imagined in the plane of a color circle through whose center the lightness axis runs.

Figure 3:
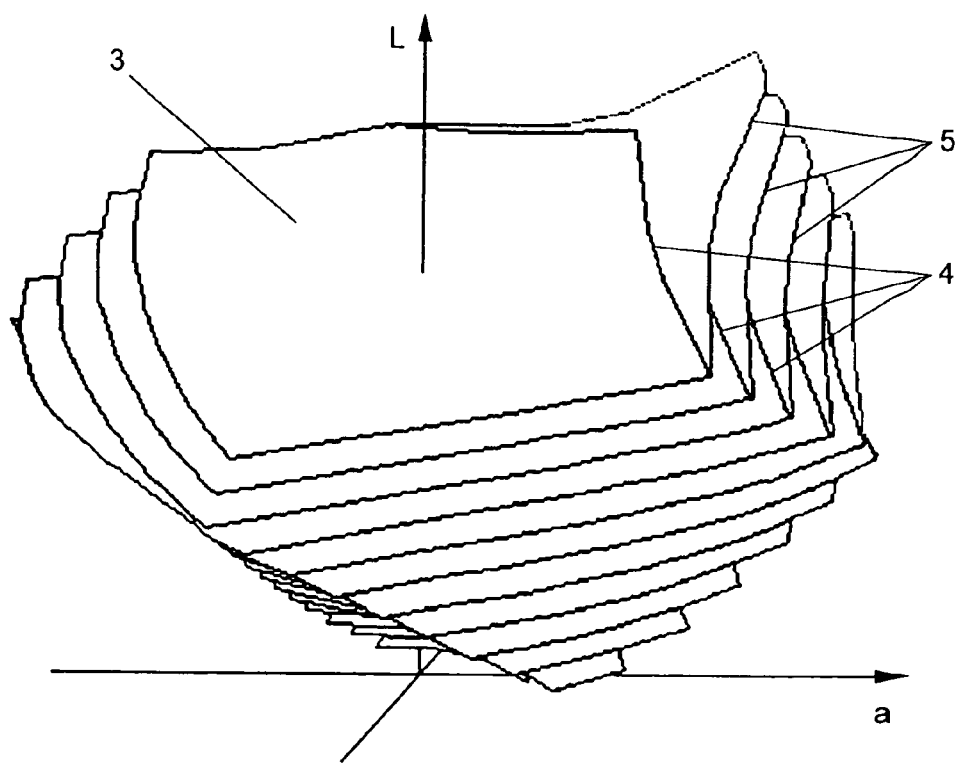
FIG. 3 shows a color body in the Lab color system.

As a result of the higher chroma of the secondary printing ink red, a greater printed color gamut is achieved in the region of the red hues than would be possible with the primary printing colors on their own. FIG. 3 illustrates that in a perspective view of a color body 3 in the Lab color system, which shows the printable color gamut in various lightness planes when, in addition to the primary printing inks CMYK, printing is also carried out with the secondary printing ink red. In order to improve the clarity, only some of the lightness planes are shown. The boundary lines 4 describe the color gamut which can be printed with the primary Colors CMYK. The boundary lines 5 in the region of the red hues describe the expanded color gamut which results with the secondary printing ink red. It also becomes clear that the color body 3 has a complex form, since the position and extent of the boundary lines 4 and 5, which identify a color gamut with respect to the ab plane, depend highly on the lightness value L.

Figure 1:
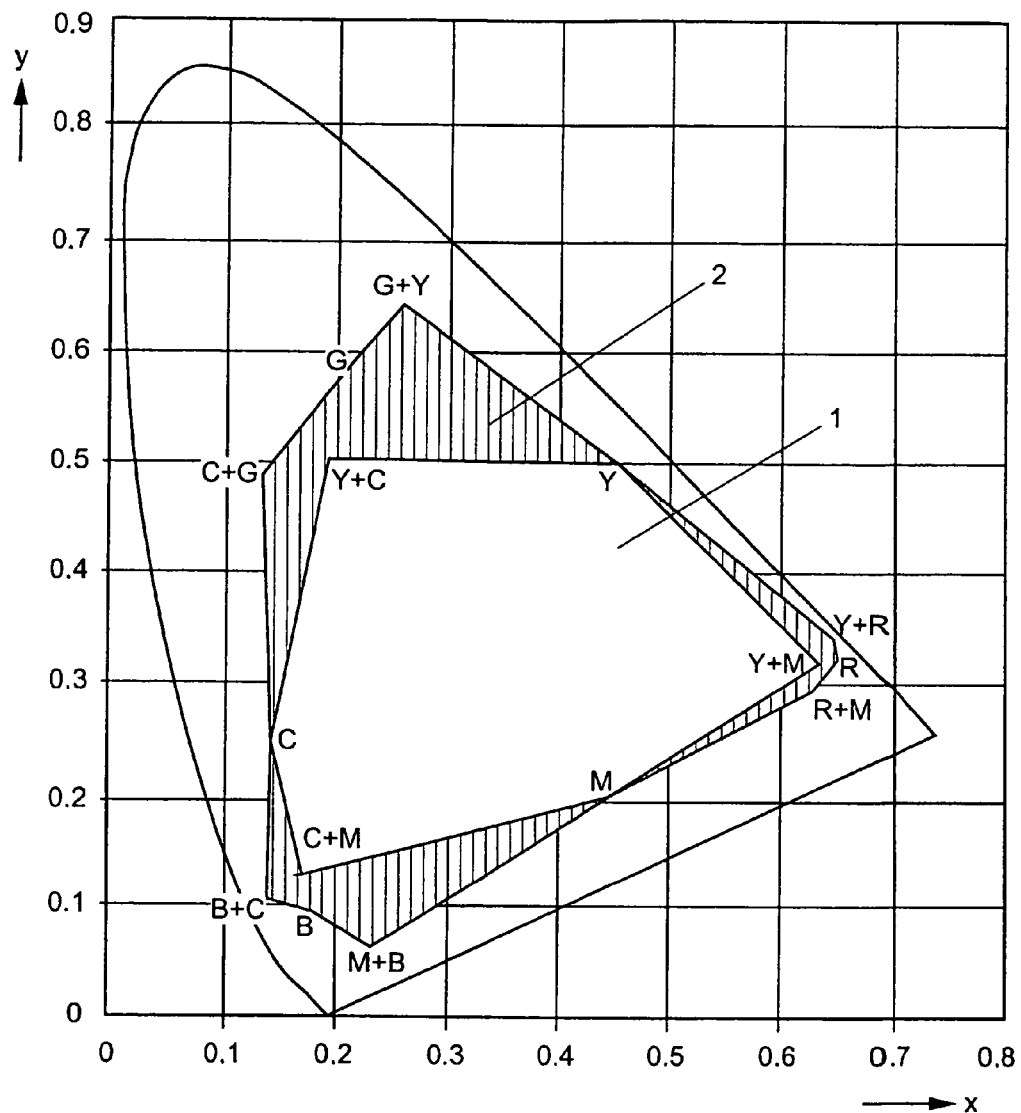
FIG. 1 shows the color gamut of a printing process with primary printing inks and a printing process with additional secondary printing inks.

Using the secondary printing inks green and blue, the color gamut can be expanded in a corresponding way in the regions of the green and blue hues. FIG. 1 shows, in an xy color locus diagram, the color gamut 1 of the primary printing inks CMYK and the expanded color gamut 2 of a seven-color printing system comprising the four primary printing inks CMYK and the three secondary printing inks RGB.

Figure 4:
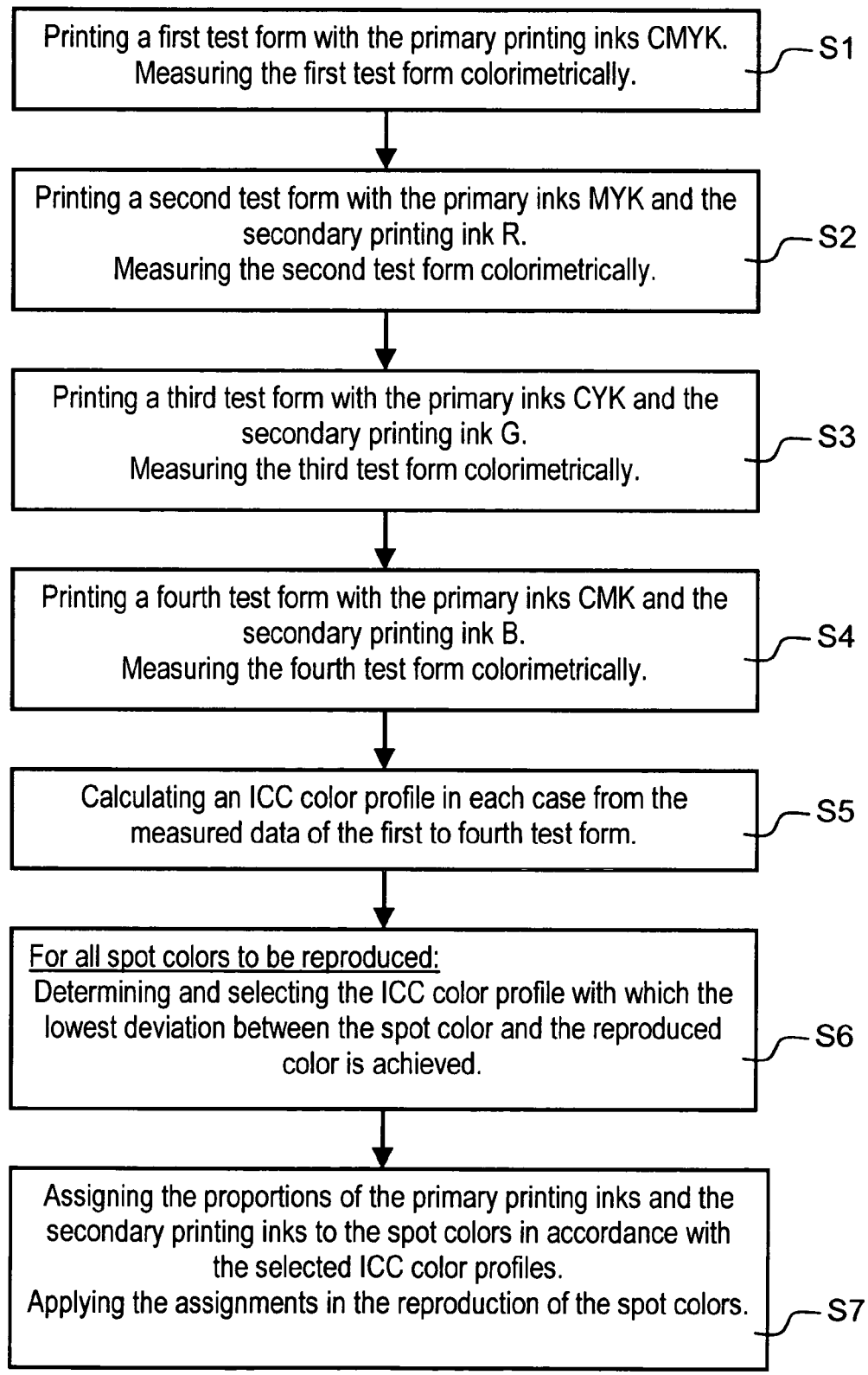
FIG. 4 is a flow chart relating to the reproduction of spot colors with primary printing inks and secondary printing inks.

The steps of the method according to the invention for determining the proportions of printing inks for the reproduction of spot colors will be described in the following text by using the flow chart shown in FIG. 4. In step S1, first of all, by using the primary printing inks CMYK, a test form is printed which is composed of an arrangement of color areas, each color area being printed with different proportions of the printing inks involved. The test form can be built up in accordance with one of the known standards, for example in accordance with ISO 12642 "Graphic technology—Prepress digital data exchange—Input data for characterization of 4-color process printing". This test form contains 928 different color areas. An extension of this test form with a total of 1485 color areas has been proposed as DIN 16614 "Expanded data for the characterization of four-color printing—Supplementary element (Draft 2003)". However, manufacturer specific test forms which comprise a sufficiently large number of color areas can also be used. Printing of the test forms is carried out under defined conditions, which are also intended to be used later when printing the printing originals which contain the spot colors. Such conditions comprise, for example, the tonal value gain of the raster dots when printing in comparison with the size of the raster dots on the printing plate, the Lab values of the full-tone printing inks, and so on. There are also international and national standards for these printing conditions, for example ISO 12647-2 "Graphic technology—Process control for the manufacture of half-tone color separations, proof and production prints—Part 2: Offset lithographic processes" or the "Process standard offset printing" of the German Federal Print and Media Association. For the purpose of screening the color separations of the test form, the usual screen angles and screen widths which are also intended to be used later during the edition printing can be used. If the intention during edition printing is to operate with frequency-modulated screening, in order to minimize the Moiré produced during the overprinting of the color separations, the test form is likewise printed with this screening. The printing process used and the corresponding definition of the printing conditions are not restricted to offset printing. Other printing processes, such as gravure printing, flexographic printing or electrophotographic digital printing, can be used. The aforementioned standards for the printing conditions do not apply if specific printing inks with higher pigmentation are to be used for the primary printing inks. In this case, the printing conditions must be selected in accordance with internal in-house standards or in accordance with the stipulations of the printing ink manufacturer or press manufacturer.

After the printing of the test form, the printed color areas are measured calorimetrically, that is to say the Lab values of the color areas are measured. This results in the characterization data for the printing process as a measured value file, which is stored in standardized form (ISO 12642 or DIN 16614) and which produces the relationship between the predefined proportions of the primary printing inks CMYK and the associated color measured values. This characteristic data is the basis for the subsequent calculation of the ICC color profiles.

In step S2 of the method according to the invention, a second test form is printed and measured. In the color areas of the second test form, the proportions of the primary printing ink cyan are replaced by corresponding proportions of the substantially complementary secondary printing ink red. The proportions of the remaining primary printing inks MYK remain unchanged. As a result of using the secondary printing ink red in conjunction with the primary printing inks magenta and yellow, which are adjacent with respect to hue, the second test form covers the sector of the red hues. By measuring the test form, characterization data of the printing process is obtained, describing the extension of the chroma of the printable colors in this color sector as a result of using the secondary printing ink red.

In step S3, a third test form is printed and measured. In the color areas of the third test form, the proportions of the primary printing ink magenta are replaced by corresponding proportions of the substantially complementary secondary printing ink green. The proportions of the remaining primary printing inks CYK remain unchanged. As a result of using the secondary printing ink green in conjunction with the primary printing inks cyan and yellow, which are adjacent with respect to hue, the third test form covers the sector of the green hues. By measuring the test form, characterization data of the printing process is obtained, describing the extension of the chroma of the printable colors in this color sector as a result of using the secondary printing ink green.

In step S4, a fourth test form is printed and measured. In the color areas of the fourth test form, the proportions of the primary printing ink yellow are replaced by corresponding proportions of the substantially complementary secondary printing ink blue. The proportions of the remaining primary printing inks CMK remain unchanged. As a result of using the secondary printing ink blue in conjunction with the primary printing inks cyan and magenta, which are adjacent with respect to hue, the fourth test form covers the sector of the blue hues. By measuring the test form, characterization data of the printing process is obtained, describing the extension of the chroma of the printable colors in this color sector as a result of using the secondary printing ink blue.

Figure 5:
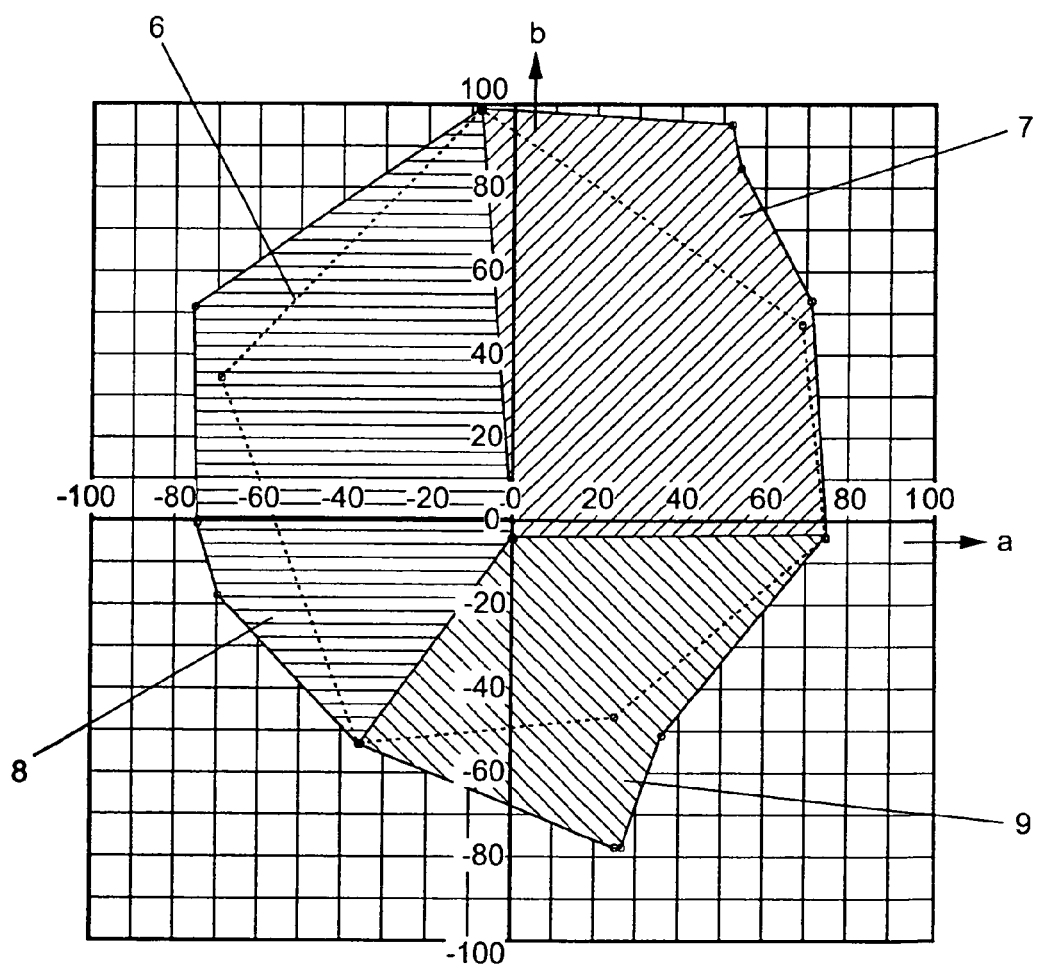
FIG. 5 is a graph showing the color gamuts of various printing ink combinations.

FIG. 5 shows, in a projection onto the ab plane of the Lab color system, the printable color gamut 6 of the primary printing inks CMYK, the sector 7 of the colors that can be printed with the printing ink combination RMYK, the sector 8 of the inks that can be printed with the printing ink combination CGYK and the sector 9 of the colors that can be printed with the printing ink combination CMBK. These sectors 7, 8 and 9 each describe the printable color gamut which can be achieved with the corresponding secondary printing ink and three primary printing inks. The printable color gamuts vary in shape and size as a function of the lightness value L (cf. FIG. 3), which is not shown in FIG. 4 in order to simplify the illustration. In the region of the colors with low and medium chroma, the color gamuts of the sectors 7, 8 and 9 overlap with the color gamut of the primary printing inks CMYK, that is to say a red hue in the overlap region could be printed both with the primary printing inks CMYK and with the printing ink combination RMYK. One of the secondary printing inks has to be used only for the colors with high chroma.

In step S5 of the method according to the invention, in each case an ICC color profile is then calculated from the characteristic data of the four test forms. As described previously, a color profile describes the association between the color components of different color spaces, so that the mutually associated colors are perceived as visually identical. In the present case, the color profiles contain the association between in each case four device dependent color components of the printing inks (CMYK, RMYK, CGYK, CMBK) and the device independent color components of the Lab color system. The definition and data formats for color profiles have been standardized by the ICC (International Color Consortium—Specification ICC.1: 2003-09). In an ICC color profile, the association between the color spaces is stored in both directions, for example the assignment Lab=f1 (CMYK) and the inverse assignment CMYK=f2 (Lab). The assignments can be defined in the form of calculation rules, for example by means of matrix operations in conjunction with nonlinear changes in the tonal value steps (gradation corrections). However, the association is preferably described with the aid of multidimensional look-up tables, in which, for a regular grid of reference points of the color components of the input color space, the associated color components of the output color space are stored. During the subsequent application of the color profile, for input color components which lie between the reference points, the associated output color components are then interpolated from stored values of the adjacent reference points.

The color profile of the primary printing inks CMYK is calculated in accordance with known methods from the characterization data of the first test form. Since the proportions of the printing inks CMYK in the color areas of the test form generally do not correspond to the combination of the color components CMYK which are needed for the reference points of the table Lab=f1 (CMYK), the content of the look-up table has to be calculated by means of an interpolation of the characterization data obtained from the test form. For this purpose, any desired interpolation rule can be used. For the calculation of the inverse table CMYK=f2 (Lab) there are a number of possible solutions, since the system of the primary printing inks is overdetermined, that is to say a color with specific Lab color components can be produced by various combinations of the proportions of CMYK.

For instance, gray colors and dark colors can be printed with a higher proportion of the primary printing ink K and correspondingly lower proportions of the primary printing colors CMY or else with a lower proportion of K and correspondingly higher proportions CMY. This decision determines what is known as the black buildup of the colors and is made with known methods such as, for example, under color removal (UCR) or gray component replacement (GCR). A corresponding decision also has to be made when calculating the inverse table CMYK=f2 (Lab). As a further technical boundary condition, maintaining the maximum area coverage has to be observed, that is to say the sum of the tonal values of the printing inks printed on one another at one point must not exceed a maximum value which, in the case of offset printing, depends on the paper grade used. The maximum area coverage is, for example, 340% for coated offset papers and 280% for uncoated papers.

The color profiles for the printing ink combinations RMYK, CGYK and CMBK are calculated formally from the characterization data of the second, third and fourth test forms in the same way as the color profile of the primary printing inks CMYK. In addition, for these printing ink combinations there is multivalency in the sense that the same Lab color can be produced with different combinations of the proportions of the printing inks. For example, a red hue of medium chroma can be produced by relatively high proportions of the primary printing inks yellow and magenta and by a small proportion of the secondary printing ink red. The same color can, however, also be produced with small proportions of the primary printing inks yellow and magenta and a correspondingly higher proportion of the secondary printing ink red. The printing ink black has a somewhat different significance in the printing ink combinations with a secondary printing ink. Proportions of black are used for lightness modulation, that is to say for producing the darker colors. A red hue which is predominantly composed of the secondary printing ink red and small proportions of yellow and magenta can be made darker by adding black. As a preferred strategy for solving the multivalency in the production of an Lab color with the printing ink combinations RMYK, CGYK and CMBK, the respective secondary printing ink is maximized when calculating the color profiles, that is to say a red hue is printed with the highest possible proportion of the secondary printing ink red and with only small proportions of yellow and magenta. Therefore, at the same time, high color stability of the printed spot color with respect to fluctuations in the printing process is achieved.

In step S6 of the method according to the invention, for each spot color to be reproduced, the ICC color profile with which the smallest deviation between the predefined Lab values of the spot color (Ls, as, bs) and the Lab values of the reproduced color (Lr, ar, br) is achieved is then determined and selected. The difference between the two Lab values is expressed by the value dE (delta E) as the Euclidian distance between the color loci in the Lab color space.

$$dE=\sqrt{(Ls-Lr)^2+(as-ar)^2+(bs-br)^2} \qquad (3)$$

For this purpose, by means of the ICC color profiles calculated in step S5, first of all the proportions of printing ink which are assigned to the predefined Lab values of the spot color (Ls, as, bs) are determined by the respective association tables f2.

CMYK=f2(Ls, as, bs)

RMYK=f2(Ls, as, bs)

CGYK=f2(Ls, as, bs)

CMBK=f2(Ls, as, bs)  (4)

For a spot color which has a red hue, in this case sensible values will result at all only for printing ink combinations CMYK and RMYK, since a red color cannot be printed with the printing ink combinations CGYK and CMBK. The printing ink combinations CGYK and CMBK correspond to sectors 8 and 9 in FIG. 5. In the color profiles of these printing inks, the red color can only be assigned proportions of printing inks whose Lab values lie on the edge of the correspondingly restricted color body, that is to say colors with a large distance dE from the desired red color. According to the method of the invention, the quality of the reproduction of the spot color with the four printing ink combinations is checked in that, by using the proportions of printing inks determined in accordance with equation (4), the Lab values resulting from these proportions of printing inks are again determined via the association tables f1 of the respective ICC color profiles.

(L1, a1, b1)=f1(CMYK)

(L2, a2, b2)=f1(RMYK)

(L3, a3, b3)=f1(CGYK)

(L4, a4, b4)=f1(CMBK)  (5)

For these Lab values, the differences dE from the predefined Lab value of the spot color are then calculated.

$$dE1=\sqrt{(Ls-L1)^2+(as-a1)^2+(bs-b1)^2}$$

$$dE2=\sqrt{(Ls-L2)^2+(as-a2)^2+(bs-b2)^2}$$

$$dE3=\sqrt{(Ls-L3)^2+(as-a3)^2+(bs-b3)^2}$$

$$dE4=\sqrt{(Ls-L4)^2+(as-a4)^2+(bs-b4)^2} \qquad (6)$$

From the differences dE1 to dE4, the smallest difference is selected and it is decided that the spot color will be printed with the printing ink combination belonging to the smallest difference. For the example of the spot color in the red area, the result would be that the differences dE3 and dE4 would be very much greater than the differences dE1 and dE2, of which the smaller would determine the printing ink combination with which the spot color is to be printed. Spot colors which lie in the inner region of the color body of the primary printing inks CMYK can be reproduced sufficiently accurately both with the primary printing inks on their own and with a combination of a secondary printing ink and three primary printing inks. Here, it is necessary to decide whether the use of a secondary printing ink makes sense for such spot colors. One preferred strategy is to print spot colors having a chroma c below a predefined threshold value, that is to say spot colors lying in the vicinity of the gray axis, only with the primary printing inks. One precondition for this is, however, that the difference dE1 is small enough, for example dE1≦1. Only for spot colors having a chroma c above the predefined threshold value would one of the printing ink combinations with a secondary printing ink be used.

Finally, in step S7 of the method according to the invention, for each spot color to be reproduced, the proportions of the printing inks of the printing ink combination which was selected in step S6, determined in accordance with equation (4), are assigned to the spot color. This assignment is, for example, stored in a spot color table, in which the name of the spot color and the associated proportions of printing inks are entered. The spot color table is used later during the production of the color separation values for the printing originals in the raster image processor. The page description languages PostScript and PDF provide descriptive elements which, on the basis of the name of a spot color, refer to what is known as an "alternate color space", whose proportions of printing inks can then be taken from the spot color table. Alternatively, the "alternate color space" can also be the Lab color space, that is to say in the page description file of the printing original, only the Lab values Ls, as, bs are specified in relation to the name of the spot color. In this case, the steps S6 and S7 of the method according to the invention are executed only at the moment at which the raster image processor interprets the page description data and produces the color separation values.

The method according to the invention has been explained for an example in which, in addition to using the primary printing inks CMYK, printing is additionally carried out with the three secondary printing inks RGB. The method can likewise be applied to the case in which only one or two additional secondary printing inks are to be used, if it is known in advance that all the spot colors used in a print job lie in one or two of the color sectors 7, 8 or 9 (FIG. 5). The method permits the printing of as many spot colors as desired with the limited number of printing units. Even the printing of what are known as running colors is possible, for example the printing of a specific hue in a large number of lightness graduations. For this case, it is only for each lightness step of this hue that a dedicated spot color needs to be defined, whose name identifies the hue and the lightness step. The method according to the invention is then applied to the spot colors defined in this way.

This application claims the priority, under 35 U.S.C. § 119, of German patent application No. 10 2004 001 937.1, filed Jan. 14, 2004; the entire disclosure of the prior application is herewith incorporated by reference.

I claim:

1. A method of reproducing spot colors with a combination of primary printing inks and at least one secondary printing ink red, green, blue, the method which comprises:

(a) printing a first test form with the primary printing inks cyan, magenta, yellow, black and subjecting the first test form to a colorimetric measurement;

(b) printing at least one further test form, with one of the primary printing inks cyan, magenta and yellow replaced by a substantially complementary secondary printing ink, and subjecting the further test form to a colorimetric measurement;

(c) calculating an ICC color profile from the measured data of each of the test forms;

(d) for each spot color to be reproduced, determining proportions of printing inks of the ICC color profile with which a lowest deviation between the spot color and a reproduced color is achieved, and selecting a printing ink combination belonging to the ICC profile; and (e) for each spot color to be reproduced, assigning the proportions of the printing inks of the selected printing ink combination to the spot color.

2. The method according to claim 1, which comprises identifying the spot colors by color values thereof in an Lab color system.

3. The method according to claim 1, which comprises deriving the printed test forms from standardized test forms.

4. The method according to claim 1, which comprises determining the deviation between the spot color and the reproduced color by way of a Euclidian distance between the color values thereof in the Lab color system.

5. The method according to claim 4, which comprises determining the color values of the reproduced color in the Lab color system by way of a reverse transformation into the Lab color values of the proportions of printing inks determined via the ICC color profiles.

6. The method according to claim 1, which comprises reproducing spot colors with a chroma value below a predefined threshold value only with the primary printing inks.

7. The method according to claim 1, which comprises reproducing spot colors whose selected printing ink combination contains a secondary printing ink with a highest possible proportion of the secondary printing ink.

* * * * *